United States Patent
Tsai et al.

(10) Patent No.: US 9,444,177 B2
(45) Date of Patent: Sep. 13, 2016

(54) WATERPROOF ELECTRICAL RECEPTACLE CONNECTOR

(71) Applicant: ADVANCED-CONNECTEK INC., New Taipei (TW)

(72) Inventors: Yu-Lun Tsai, New Taipei (TW); Pin-Yuan Hou, New Taipei (TW); Chung-Fu Liao, New Taipei (TW); Ya-Fen Kao, New Taipei (TW); Rui Su, New Taipei (TW); Long-Fei Chen, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 14/966,302

(22) Filed: Dec. 11, 2015

(65) Prior Publication Data

US 2016/0181723 A1 Jun. 23, 2016

(30) Foreign Application Priority Data

Dec. 19, 2014 (CN) .......................... 2014 1 0792602

(51) Int. Cl.
*H01R 13/40* (2006.01)
*H01R 13/52* (2006.01)

(52) U.S. Cl.
CPC ........ *H01R 13/5202* (2013.01); *Y10S 439/936* (2013.01)

(58) Field of Classification Search
CPC .. H01R 13/52; H01R 13/502; H01R 13/521; H01R 13/5216; H01R 13/5219; H01R 13/5202; H01R 13/6587; H01R 13/6594; H01R 33/965; Y10S 439/936
USPC ............... 439/587, 271, 272, 276, 283, 588, 439/607.35, 607.36, 936
See application file for complete search history.

(56) References Cited

U.S. PATENT DOCUMENTS

| | | | | |
|---|---|---|---|---|
| 7,922,535 | B1* | 4/2011 | Jiang .................. | H01R 13/5205 439/271 |
| 8,348,688 | B2* | 1/2013 | Liu ..................... | H01R 13/5219 439/271 |
| 8,388,380 | B1* | 3/2013 | Van der Steen ... | H01R 13/5202 439/607.36 |
| 8,662,928 | B1* | 3/2014 | Xie .................... | H01R 13/6594 439/607.35 |
| 8,801,463 | B2* | 8/2014 | Tan .................... | H01R 13/5202 439/607.04 |
| 8,827,742 | B2* | 9/2014 | Wang .................. | H01R 24/68 439/569 |
| 9,017,088 | B2* | 4/2015 | Endo ................... | H01R 9/00 439/276 |
| 9,112,296 | B2* | 8/2015 | Zhang ................. | H01R 13/516 |
| 2012/0315779 | A1* | 12/2012 | Yudate ................ | H01R 12/724 439/271 |
| 2013/0065442 | A1* | 3/2013 | Nagata ............... | H01R 13/5202 439/607.58 |

(Continued)

*Primary Examiner* — Neil Abrams
*Assistant Examiner* — Travis Chambers
(74) *Attorney, Agent, or Firm* — Muncy, Geissler, Olds & Lowe, P.C.

(57) ABSTRACT

A waterproof electrical receptacle connector includes a plastic shell, a metallic shell, an insulated housing, and a sealing member (e.g., a waterproof glue block). The plastic shell has a through hole and includes an inserting end and a sealed end respectively at two sides of the through hole. The metallic shell is disposed in the through hole and the metallic shell defines a receiving cavity. The insulated housing is disposed in the receiving cavity. A plurality of receptacle terminals is assembled to the insulated housing. The sealing member is filled in the sealed end to fill a gap between the metallic shell and the plastic shell, and the sealing member is also filled in the bottom of the base portion where the receptacle terminals are exposed for improving the waterproof function of the connector.

10 Claims, 11 Drawing Sheets

(56) References Cited

U.S. PATENT DOCUMENTS

| | | | |
|---|---|---|---|
| 2013/0183844 A1* | 7/2013 | Wang | H01R 24/68 439/271 |
| 2015/0236441 A1* | 8/2015 | Kim | H01R 24/76 439/587 |
| 2015/0244099 A1* | 8/2015 | Lee | H01R 13/508 439/660 |
| 2016/0020549 A1* | 1/2016 | Chen | H01R 13/5202 439/78 |
| 2016/0033198 A1* | 2/2016 | Hsiao | F26B 3/28 439/485 |
| 2016/0104957 A1* | 4/2016 | Kim | H01R 13/6581 439/78 |
| 2016/0149337 A1* | 5/2016 | Ozaki | H01R 13/73 439/529 |

\* cited by examiner

| GND | TX1+ | TX1− | VBUS | CC1 | D+ | D− | RFU | VBUS | RX2− | RX2+ | GND |
|---|---|---|---|---|---|---|---|---|---|---|---|
| GND | RX1+ | RX1− | VBUS | RFU | D− | D+ | CC2 | VBUS | TX2− | TX2+ | GND |

FIG. 6

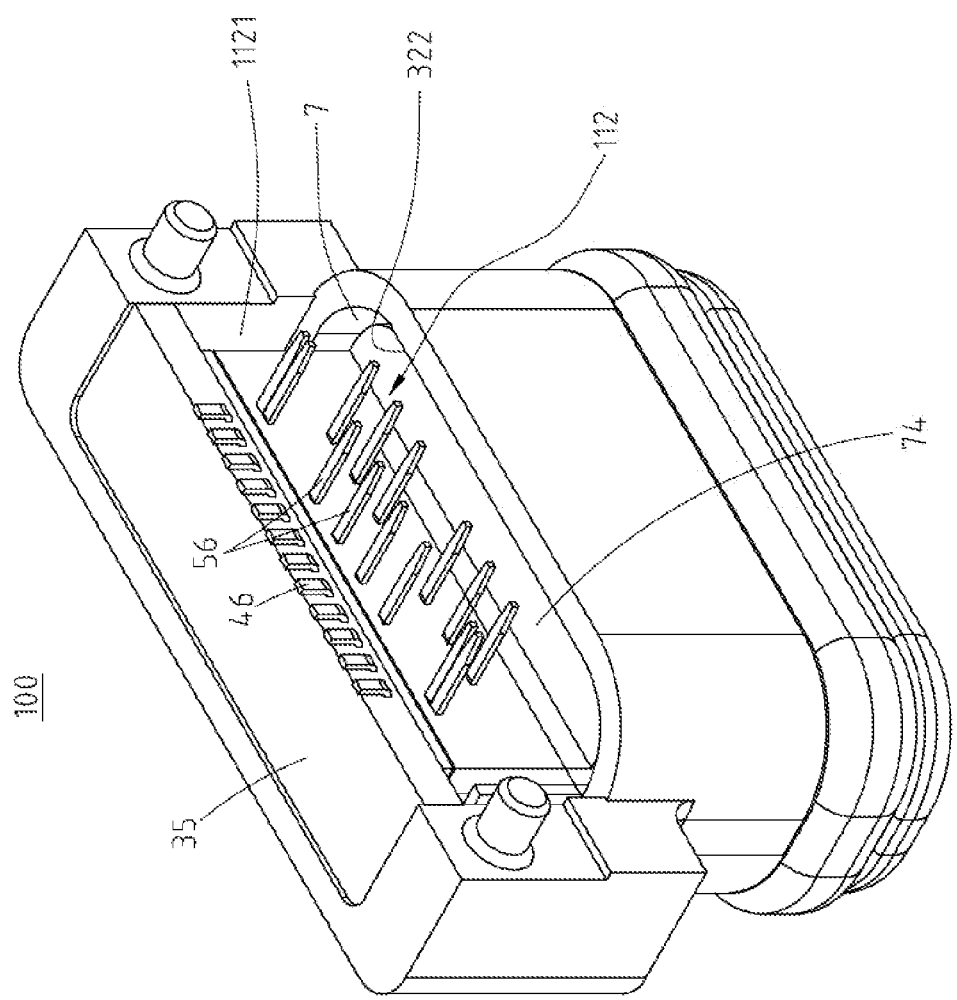

WATERPROOF ELECTRICAL RECEPTACLE CONNECTOR

CROSS-REFERENCES TO RELATED APPLICATIONS

This non-provisional application claims priority under 35 U.S.C. §119(a) on Patent Application No. 201410792602.5 filed in China, P.R.C. on 2014 Dec. 19, the entire contents of which are hereby incorporated by reference.

FIELD OF THE INVENTION

The instant disclosure relates to an electrical receptacle connector, and more particular to a waterproof electrical receptacle connector.

BACKGROUND

Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing.

Specifically, an existing USB type-C electrical receptacle connector includes an insulated housing, a plurality of first terminals, a plurality of second terminals, and a hollowed shell. The insulated housing includes a base portion and a tongue portion extended from one side of the base portion. The first terminals are held in the base portion and the tongue portion. The front of each of the first terminals is disposed at an upper surface of the tongue portion, and the rear of each of the first terminals is protruded from the base portion for connecting with a circuit board. The second terminals are held in the base portion and the tongue portion. The front of each of the second terminals is disposed at a lower surface of the tongue portion, and the rear of each of the second terminals is protruded from the base portion for connecting with the circuit board. The hollowed shell encloses the insulated housing. However, the hollowed shell is devoid of a waterproof structure which can prevent water moist at the front of the hollowed shell from penetrating into the rear of the hollowed shell. In other words, the rear of the hollowed shell lacks any sealing structure so that a gap may be formed between the rear of the insulated housing and any other member in the connector. Therefore, the water moist may enter into an electronic device assembled with the connector. That is, the circuit board inside the electronic device may get wet which may further lead the malfunction of the electronic device.

SUMMARY OF THE INVENTION

Consequently, how to improve the existing connector becomes an issue.

In view of this, an exemplary embodiment of the instant disclosure provides a waterproof electrical receptacle connector which can provide a waterproof function in an efficient manner and prevents water moist from entering into an electronic device assembled with the connector through the connector.

An exemplary embodiment of the waterproof electrical receptacle connector comprises a plastic shell, a metallic shell, an insulated housing, a plurality of first receptacle terminals, a plurality of second receptacle terminals, and a sealing member (e.g., a waterproof glue block). The plastic shell has a through hole and comprises an inserting end and a sealed end which are respectively at two sides of the through hole. The metallic shell is disposed in the through hole and the metallic shell defines a receiving cavity. The insulated housing is disposed in the receiving cavity. The insulated housing comprises a base portion and a tongue portion extended from one side of the base portion. The tongue portion has an upper surface and a lower surface opposite to the upper surface. The base portion is located at the sealed end. The first receptacle terminals comprise a plurality of first signal terminals, at least one first power terminal, and at least one first ground terminal. Each of the first receptacle terminals is held in the insulated housing and disposed at the upper surface. The second receptacle terminals comprise a plurality of second signal terminals, at least one second power terminal, and at least one second ground terminal. Each of the second receptacle terminals is held in the insulated housing and disposed at the lower surface. The sealing member is formed at the sealed end to fill a gap between the metallic shell and the plastic shell and to fill the bottom of the base portion where the second receptacle terminals are exposed out of.

Based on the above, the sealing member (e.g., the waterproof glue block) is formed at the sealed end of the plastic shell, and the sealing member fills the gaps between the plastic shell and the metallic shell and fills the bottom of the base portion where the second receptacle terminals are exposed out of. Accordingly, water moist cannot enter into the connector through the through hole. In addition, waterproof gaskets are fitted over the plastic shell and abutted against the inner wall of an electronic device assembled with the connector, so that water moist cannot enter into the electronic device through the gaps between the plastic shell and the metallic shell. Moreover, the waterproof gasket is abutted between the inner wall of the plastic shell and the outer wall of the metallic shell to prevent water moist from entering into the connector through the gap between the plastic shell and the metallic shell. Consequently, water moist can be efficiently prevented from entering into the electronic device assembled with the connector.

Furthermore, the first receptacle terminals and the second receptacle terminals are arranged upside down, and the pin-assignment of the first flat contact portions of the first receptacle terminals is left-right reversal with respect to that of the second flat contact portions of the second receptacle terminals. Accordingly, the waterproof electrical receptacle connector can have a 180 degree symmetrical, dual or double orientation design and pin assignments which enables the waterproof electrical receptacle connector to be mated with a corresponding plug connector in either of two intuitive orientations, i.e. in either upside-up or upside-down directions. Therefore, when an electrical plug connector is inserted into the waterproof electrical receptacle connector with a first orientation, the first flat contact portions of the first receptacle terminals are in contact with upper-row plug terminals of the electrical plug connector. Conversely, when the electrical plug connector is inserted into the waterproof electrical receptacle connector with a second orientation, the second flat contact portions of the second receptacle terminals are in contact with the upper-row plug terminals of the electrical plug connector. Note that, the inserting orientation of the electrical plug connector is not limited by the instant disclosure.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims and drawings in the instant disclosure.

BRIEF DESCRIPTION OF THE DRAWINGS

The instant disclosure will become more fully understood from the detailed description given herein below for illustration only, and thus not limitative of the instant disclosure, wherein:

FIG. 6 illustrates a schematic configuration diagram of the receptacle terminals of the waterproof electrical receptacle connector shown in FIG. 5;

FIG. 7A illustrates a standing perspective view of the waterproof electrical receptacle connector;

DETAILED DESCRIPTION

Figure 1:
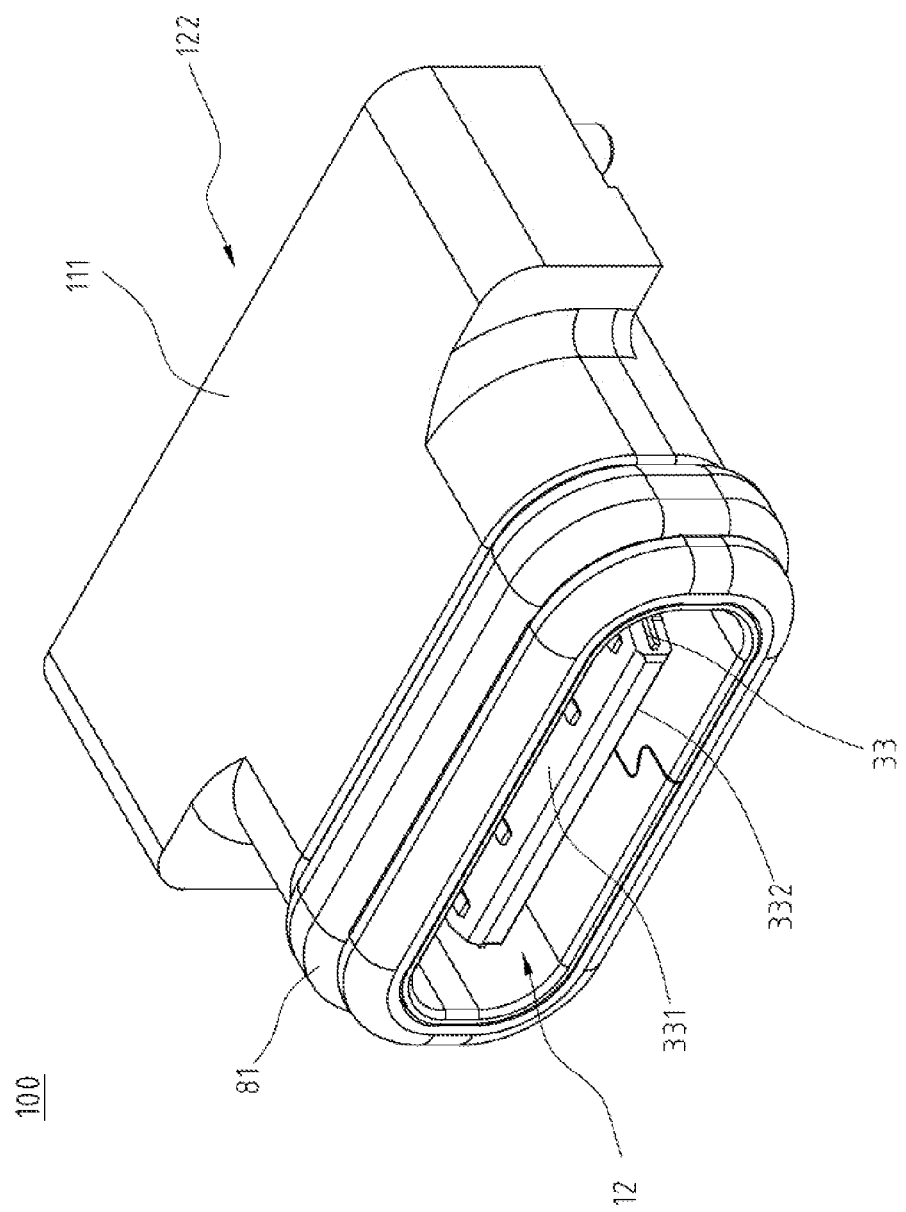
FIG. 1 illustrates a perspective view of a waterproof electrical receptacle connector according to an exemplary embodiment of the instant disclosure.
Figure 2:
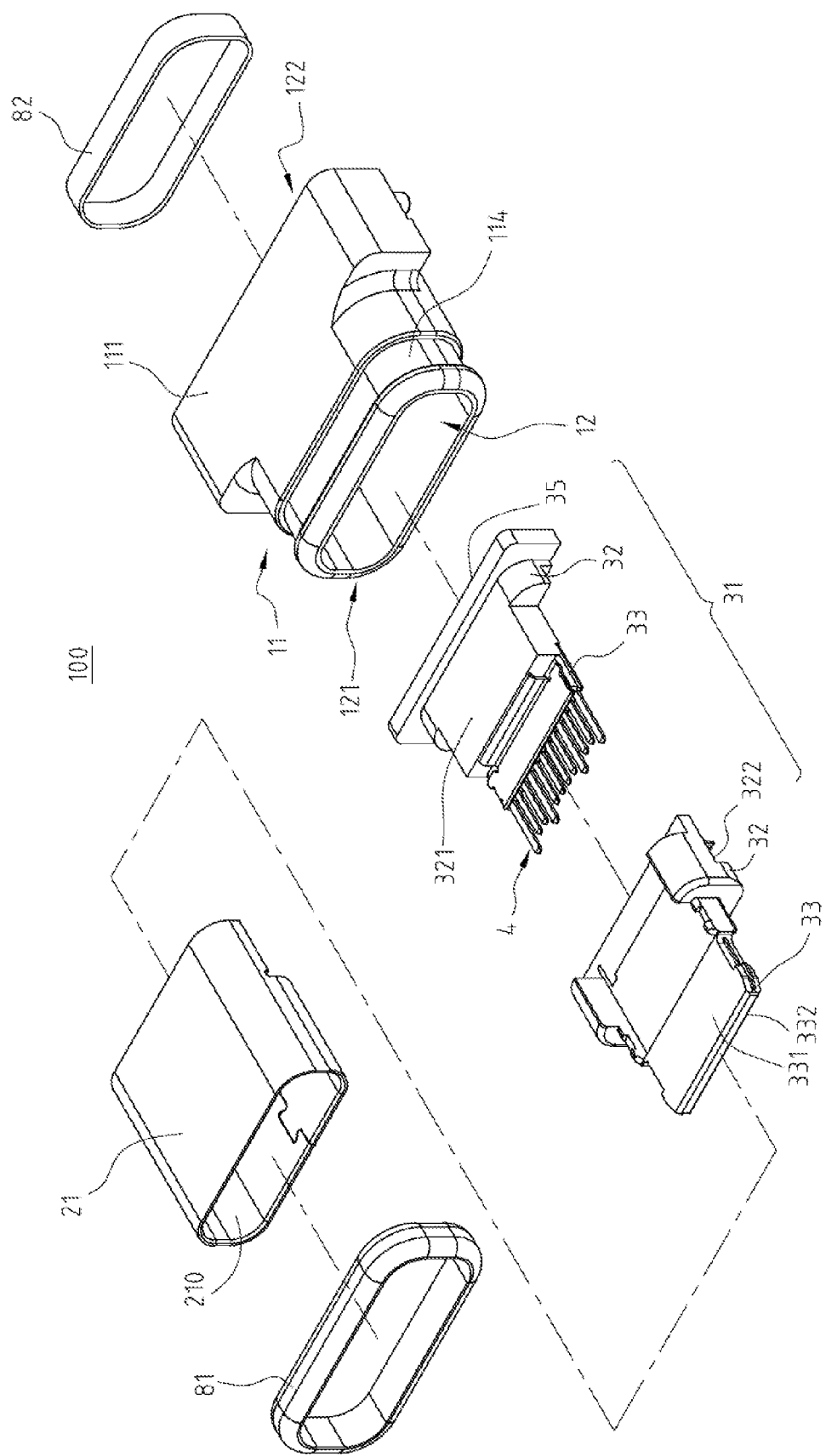
FIG. 2 illustrates an exploded view of the waterproof electrical receptacle connector.
Figure 3:
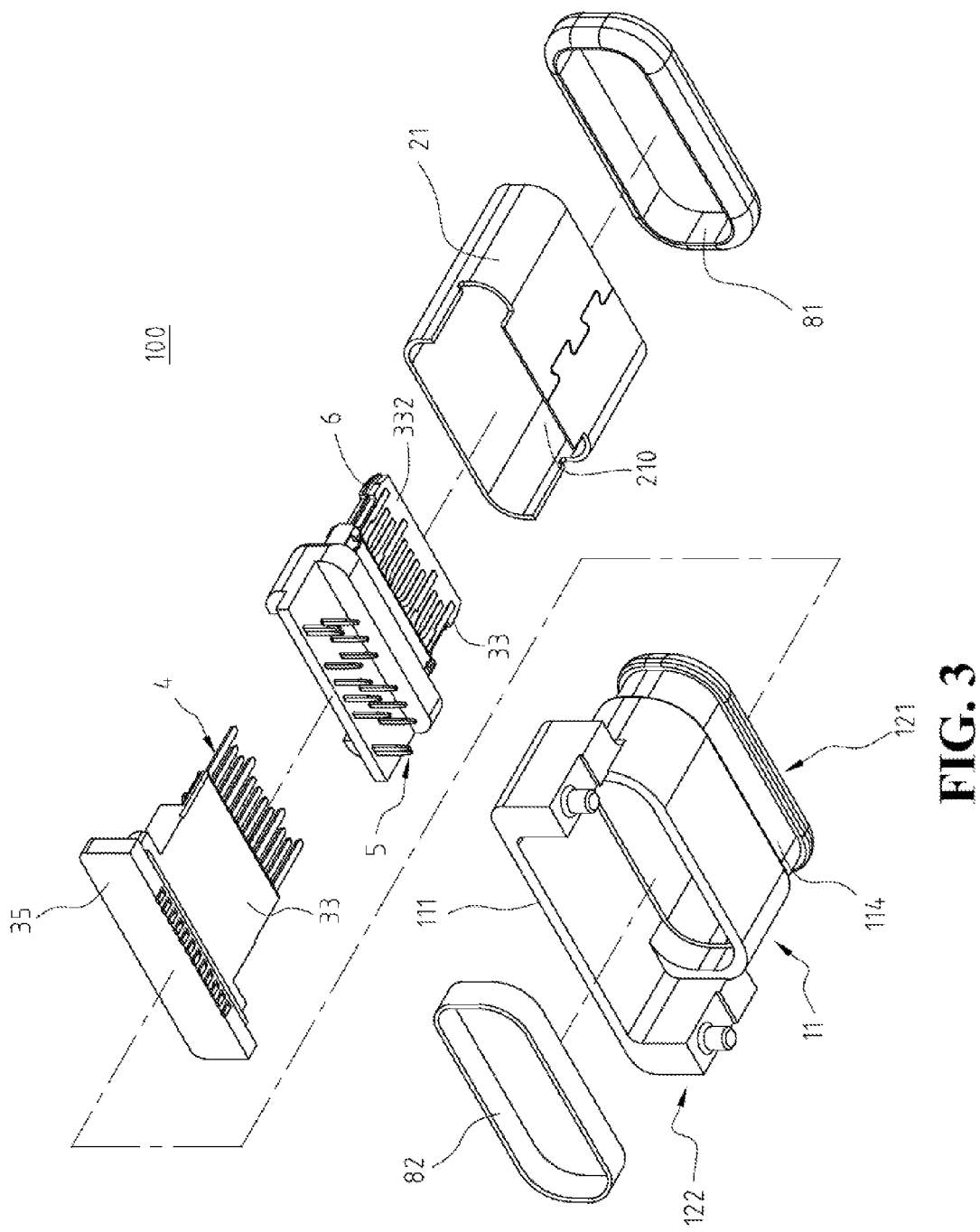
FIG. 3 illustrates an exploded view from the back of the waterproof electrical receptacle connector.

Please refer to FIG. 1 to FIG. 3, which illustrate a waterproof electrical receptacle connector 100 of a first embodiment according to the instant disclosure. FIG. 1 illustrates a perspective view of the waterproof electrical receptacle connector 100. FIG. 2 illustrates an exploded view of the waterproof electrical receptacle connector 100. FIG. 3 illustrates an exploded view from the back of the waterproof electrical receptacle connector 100. In this embodiment, the waterproof electrical receptacle connector 100 can provide a reversible or dual orientation USB Type-C connector interface and pin assignments, i.e., a USB Type-C receptacle connector. The connector can be utilized in mobile devices, laptop computers, digital cameras, or other electronic devices. In this embodiment, the waterproof electrical receptacle connector 100 comprises a plastic shell 11, a metallic shell 21, an insulated housing 31, a plurality of first receptacle terminals 4, a plurality of second receptacle terminals 5, and a sealing member 7 (e.g., a waterproof glue block 74). In addition, the waterproof electrical receptacle connector 100 further comprises a grounding plate 6 disposed in the insulated housing 31 and located between the first receptacle terminals 4 and the second receptacle terminals 5. Specifically, the waterproof electrical receptacle connector 100 may have receptacle terminals aligned in one row. In other words, the waterproof electrical receptacle connector 100 may only have the first receptacle terminals 4 or the second receptacle terminals 5. In this embodiment, the waterproof electrical receptacle connector 100 comprises both the first receptacle terminals 4 and the second receptacle terminals 5, but embodiments are not limited thereto. The connector may have receptacle terminals aligned in one row according to practical requirements or cost consideration.

The plastic shell 11 is a hollowed shell made of plastic. The plastic shell 11 defines a through hole 12 and comprises an inserting end 121 and a sealed end 122 respectively at two sides of the through hole 12. The through hole 12 is formed as an inserting opening which is near to the front of the inserting end 121 and the rear of the sealed end 122. The inserting end 121 is provided for connecting with an electrical plug connector, and the sealed end 122 is provided for receiving the sealing member 7. The sealed end 122 of the plastic shell 11 may be provided for being assembled with a circuit board.

Figure 7B:
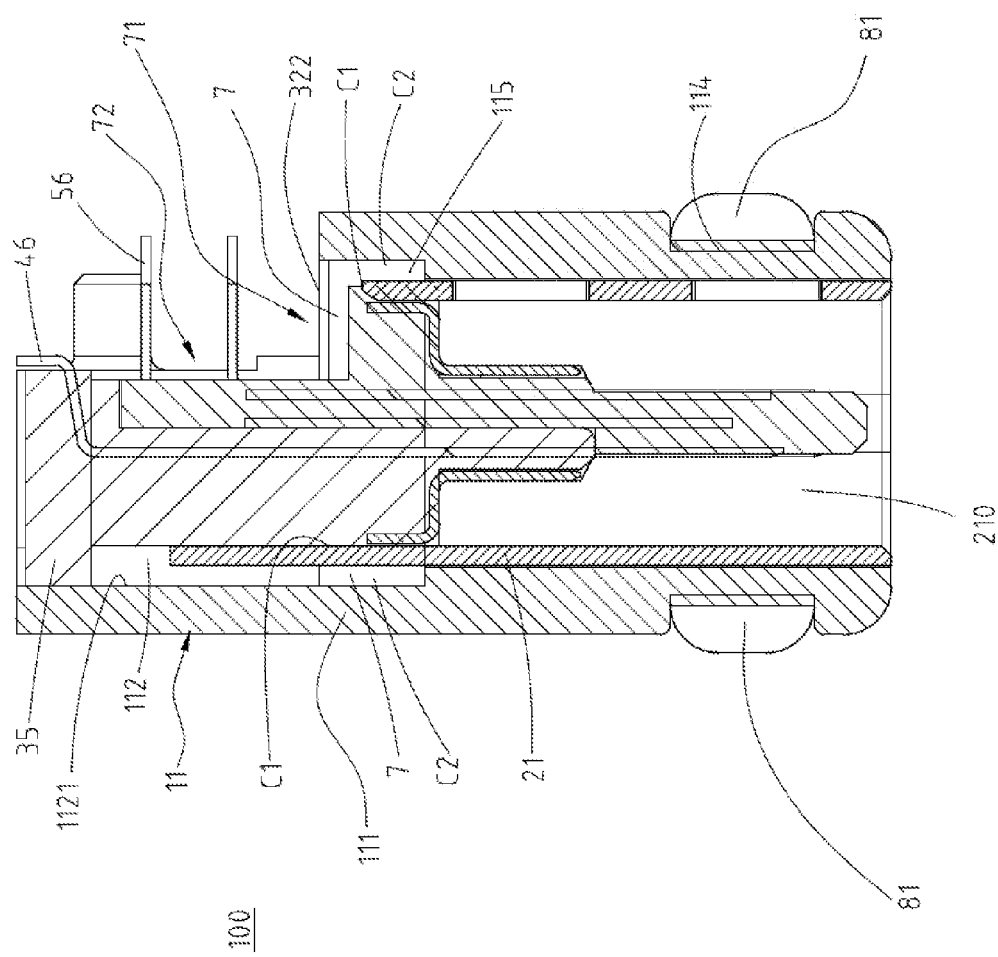
FIG. 7B illustrates a standing sectional view of the waterproof electrical receptacle connector.

In this embodiment, the plastic shell 11 comprises a rear lid 111 and a filling section 112. The rear lid 111 is approximately formed as upside-down U-shaped. The rear lid 111 is extended from the rear of the plastic shell 11 and located at the top and the two sides of the sealed end 122. In other words, the bottom of the rear of the plastic shell 11 is not enclosed by the rear lid 111 like a opening room/space. The inserting end 121 communicates with the interior of the rear lid 111 through the through hole 12 and the sealed end 122. Accordingly, when the base portion 32 of the insulated housing 31 is assembled in the rear lid 111, the filling section 112 is located at the sealed end 122 and formed between the rear lid 111 and the base portion 32 (as shown in FIG. 7B), and the filling section 112 is provided for receiving the sealing member 7.

The metallic shell 21 is a hollowed shell. The metallic shell 21 is disposed in the through hole 12. A first gap C1 is defined between the metallic shell 21 and the inner wall of the plastic shell 11, as shown in FIG. 7B. In addition, the metallic shell 21 defines a receiving cavity 210 therein. The metallic shell 21 encloses the base portion 32 and the tongue portion 33 of the insulated housing 31. The metallic shell 21 can be provided for reducing the electromagnetic interference when the first receptacle terminals 4 and the second receptacle terminals 5 are transmitting signals.

The insulated housing 31 is disposed in the receiving cavity 210. In addition, a second gap C2 is defined between the insulated housing 31 and the inner wall of the metallic shell 21, as shown in FIG. 7B. The insulated housing 31 comprises a base portion 32 and a tongue portion 33. In this embodiment, the base portion 32 and the tongue portion 33 are respectively injection molded or the like. Moreover, the base portion 32 and the tongue portion 33 may be formed by a unitary member or a multi-piece member. In addition, the base portion 32 is located at the sealed end 122. The tongue portion 33 is extended from one side of the base portion 32 and further extended toward the inserting end 121. The tongue portion 33 has an upper surface 331 and a lower surface 332 opposite to the upper surface 331. In this embodiment, the top 321 of the base portion 32 is close to the inner wall of the rear lid 111, while the bottom 322 of the base portion 32 is exposed out of the bottom of the rear lid 111. Moreover, the insulated housing 31 further comprises a plastic block 35 extended from the rear of the base portion 32. The outer diameter of the plastic block 35 is greater than the outer diameter of the base portion 32, so that the plastic block 35 is located at the rear of the interior of the rear lid 111. The plastic block 35 is abutted against the inner wall of the rear lid 111, so that a gap is defined between the top of the base portion 32 and the inner wall of the rear lid 111. In other words, when the plastic block 35 is abutted against the inner wall of the rear lid 111, the plastic block 35, the rear lid 111, and the base portion 32 define an upside-down U-shaped filling passage 1121, and the filling passage 1121 is substantially defined by the filling section 112, and the filling passage 1121 is a passage provided for receiving the sealing member 7.

Figure 4:
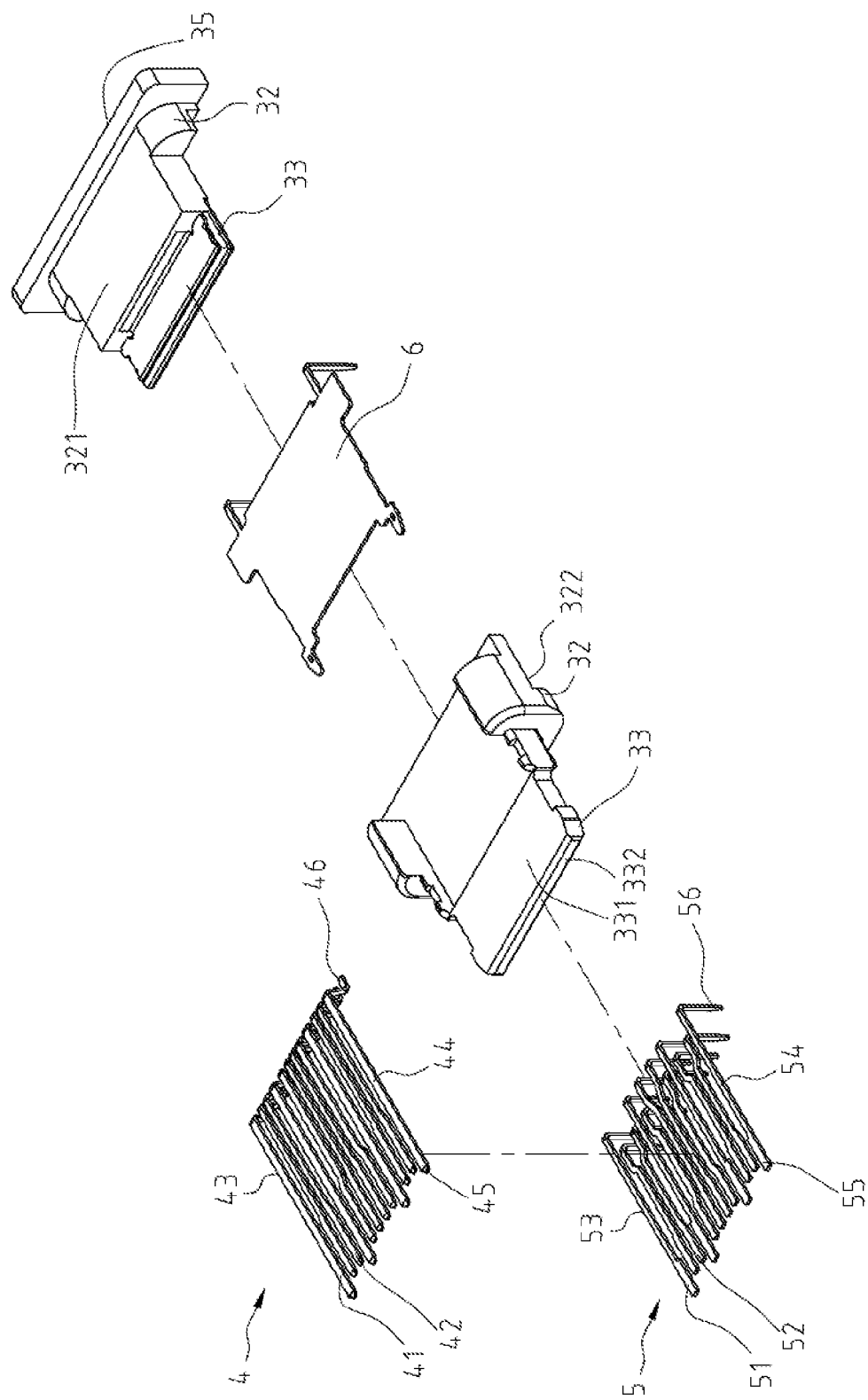
FIG. 4 illustrates an exploded view showing an insulated housing, a plurality of first receptacle terminals, and a plurality of second receptacle terminals of the waterproof electrical receptacle connector.
Figure 5:
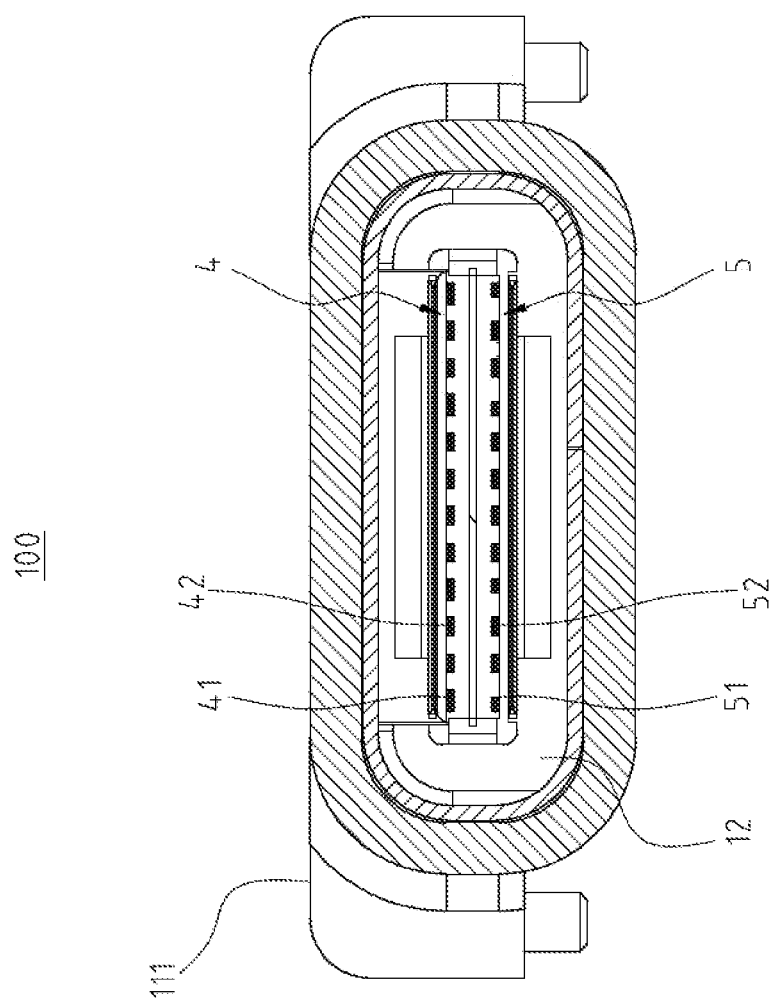
FIG. 5 illustrates a front sectional view of the waterproof electrical receptacle connector.

Please refer to FIGS. 4 to 6. The first receptacle terminals 4 are held in the base portion 32 and the tongue portion 33. Each of the first receptacle terminals 4 comprises a first flat contact portion 45, a first body portion 44, and a first tail portion 46. The first body portions 44 are held in the base portion 32 and disposed at the upper surface 331 of the tongue portion 33. For each of the first receptacle terminals 4, the first flat contact portion 45 is extended from one of two ends of the first body portion 44 and disposed at the upper surface 331 of the tongue portion 33, and the first tail portion 46 is extended from the other end of the first body portion 44 and exposed out of the base portion 32. The first signal terminals 41 are disposed at the upper surface 331 of the tongue portion 33 and provided for transmitting first signals (i.e., USB 3.0 signals). The first tail portions 46 are extended out of a bottom of the base portion 32. Furthermore, the first tail portions 46 are bent horizontally to form flat legs, named SMT (surface mounted technology) legs, which can be mounted or soldered on the surface of a printed circuit board (PCB) by using surface mount technology, as shown in FIG. 4.

Please refer to FIGS. 4 to 6. The second receptacle terminals 5 are held in the base portion 32 and the tongue portion 33. The second receptacle terminals 5 are spacedly aligned below the first receptacle terminals 4. Each of the second receptacle terminals 5 comprises a second flat contact portion 55, a second body portion 54, and a second tail portion 56. The second body portions 54 are held in the base portion 32 and disposed at the lower surface 332 of the tongue portion 33. For each of the second receptacle terminals 5, the second flat contact portion 55 is extended from one of two ends of the second body portion 54 and disposed at the lower surface 332 of the tongue portion 33, and the second tail portion 56 is extended from the other end of the second body portion 54 and exposed out of the base portion 32. The second signal terminals 51 are disposed at the lower surface 332 of the tongue potion 33 and provided for transmitting second signals (i.e., USB 3.0 signals). The second tail portions 56 are extended out of the bottom of the base portion 32. In addition, the second tail portions 56 are extended downwardly to form vertical legs, named through-hole legs, that are inserted into holes drilled in a printed circuit board (PCB) by using through-hole technology, as shown in FIG. 4. In this embodiment, the first tail portions 46 and the second tail portions 56 are protruded out of the base portion 32 and arranged separately. For example, the first tail portions 46 and the second tail portions 56 may form three rows.

Please refer to FIGS. 4 to 6. In this embodiment, the first receptacle terminals 4 comprise a plurality of first signal terminals 41, at least one first power terminal 42, and at least one first ground terminal 43. As shown in FIG. 6, the first receptacle terminals 4 comprise, from left to right, a first ground terminal 43 (Gnd), a first pair of differential signal terminals (TX1+−), a second pair of differential signal terminals (D+−), and a third pair of differential signal terminals (RX2+−) of the first signal terminals 41, first power terminals 42 (Power/VBUS) between the three pairs of differential signal terminals, a retain terminal (RFU) and another first ground terminal 43 (Gnd). However, the pin assignments are not thus limited, and the example described here is only for illustrative purposes. In this embodiment, twelve first receptacle terminals 4 are provided for transmitting USB 3.0 signals, but embodiments are not limited thereto. In some embodiments, the rightmost first ground terminal 43 (or the leftmost first ground terminal 43) and the retain terminal are omitted. Furthermore, the rightmost first ground terminal 43 may be replaced by a first power terminal 42 and provided for power transmission.

Please refer to FIGS. 4 to 6. In this embodiment, the second receptacle terminals 5 comprise a plurality of second signal terminals 51, at least one second power terminal 52, and at least one second ground terminal 53. As shown in FIG. 6, the second receptacle terminals 5 comprise, from left to right, a second ground terminal 53 (Gnd), a first pair of differential signal terminals (TX2+−), a second pair of differential signal terminals (D+−), and a third pair of differential signal terminals (RX1+−) of the second signal terminals 51, second power terminals 52 (Power/VBUS) between the three pairs of differential signal terminals, a retain terminal (RFU) and another second ground terminal 53 (Gnd). However, the pin assignments are not thus limited, and the example described here is only for illustrative purposes. In this embodiment, twelve second receptacle terminals 5 are provided for transmitting USB 3.0 signals, but embodiments are not limited thereto. In some embodiments, the rightmost second ground terminal 53 (or the leftmost second ground terminal 53) and the retain terminal are omitted. Furthermore, the rightmost second ground terminal 53 may be replaced by a second power terminal 52 and provided for power transmission.

In the forgoing embodiments, the receptacle terminals 4, 5 are provided for transmitting USB 3.0 signals, but embodiments are not limited thereto. In some embodiments, for the first receptacle terminals 4 in accordance with transmission of USB 2.0 signals, the first and third pairs of differential signal terminals (TX1+−, RX2+−), are omitted, and the second pair of differential signal terminals (D+−) and the first power terminals (Power/VBUS) 42 are retained. While for the second receptacle terminals 5 in accordance with transmission of USB 2.0 signals, the first and third pairs of differential signal terminals (TX2+−, RX1+−) are omitted, and the second pair of differential signal terminals (D+−) and the second power terminals (Power/VBUS) 52 are retained.

Please refer to FIGS. 4 to 6. In this embodiment, the first receptacle terminals 4 and the second receptacle terminals 5 are respectively disposed at the upper surface 331 and the lower surface 332 of the tongue portion 33. In this embodiment, as shown in FIG. 5 and FIG. 6, the position of the first receptacle terminals 4 corresponds to the position of the second receptacle terminals 5. Additionally, pin-assignments of the first receptacle terminals 4 and the second receptacle terminals 5 are point-symmetrical with a central point of the receptacle cavity 210 as the symmetrical center. In other words, pin-assignments of the first receptacle terminals 4 and the second receptacle terminals 5 have 180 degree symmetrical design with respect to the central point of the receptacle cavity 210 as the symmetrical center. The dual or double orientation design enables an electrical plug connector to be inserted into the waterproof electrical receptacle connector 100 in either of two intuitive orientations, i.e., in either upside-up or upside-down directions. Here, point-symmetry means that after the first receptacle terminals 4 (or the second receptacle terminals 5), are rotated by 180 degrees with the symmetrical center as the rotating center, the first receptacle terminals 4 and the second receptacle terminals 5 are overlapped. That is, the rotated first receptacle terminals 4 are arranged at the position of the original second receptacle terminals 5, and the rotated second receptacle terminals 5 are arranged at the position of the original first receptacle terminals 4. In other words, the first receptacle terminals 4 and the second receptacle terminals 5 are arranged upside down, and the pin assignments of the first flat contact portions 45 are left-right reversal with respect to that of the second flat contact portions 55. An electrical plug connector is inserted into the waterproof electrical receptacle connector 100 with a first orientation where the upper surface 331 is facing up, for transmitting first signals. Conversely, the electrical plug connector is inserted into the waterproof electrical receptacle connector 100 with a second orientation where the upper surface 331 is facing down, for transmitting second signals. Furthermore, the specification for transmitting the first signals is conformed to the specification for transmitting the second signals. Note that, the inserting orientation of the electrical plug connector is not limited by the waterproof electrical receptacle connector 100 according embodiments of the instant disclosure.

Please refer to FIGS. 7A and 7B. The sealing member 7 is a waterproof glue block 74 formed by drying and solidifying a liquid. In this embodiment, before the sealing member 7 is dried and set, the sealing member 7 is filled in the sealed end 122 of the plastic shell 11, and it is also filled in the second gap C2 between the plastic shell 11 and the metallic shell 21. In addition, the sealing member 7 is filled in the first gap C1 between the metallic shell 21 and the inner wall of the plastic shell 11. Therefore, after the sealing member 7 is dried and set, the sealing member 7 can prevent water moist stayed at the inserting end 121 of the plastic shell 11 from penetrating into the sealed end 122 through the through hole 12. In other words, when the waterproof electrical receptacle connector 100 is assembled to an electronic device, water moist cannot enter into the electronic device through the waterproof electrical receptacle connector 100 and would not affect the operation of electronic components on a circuit board of the electronic device.

Figure 8A:
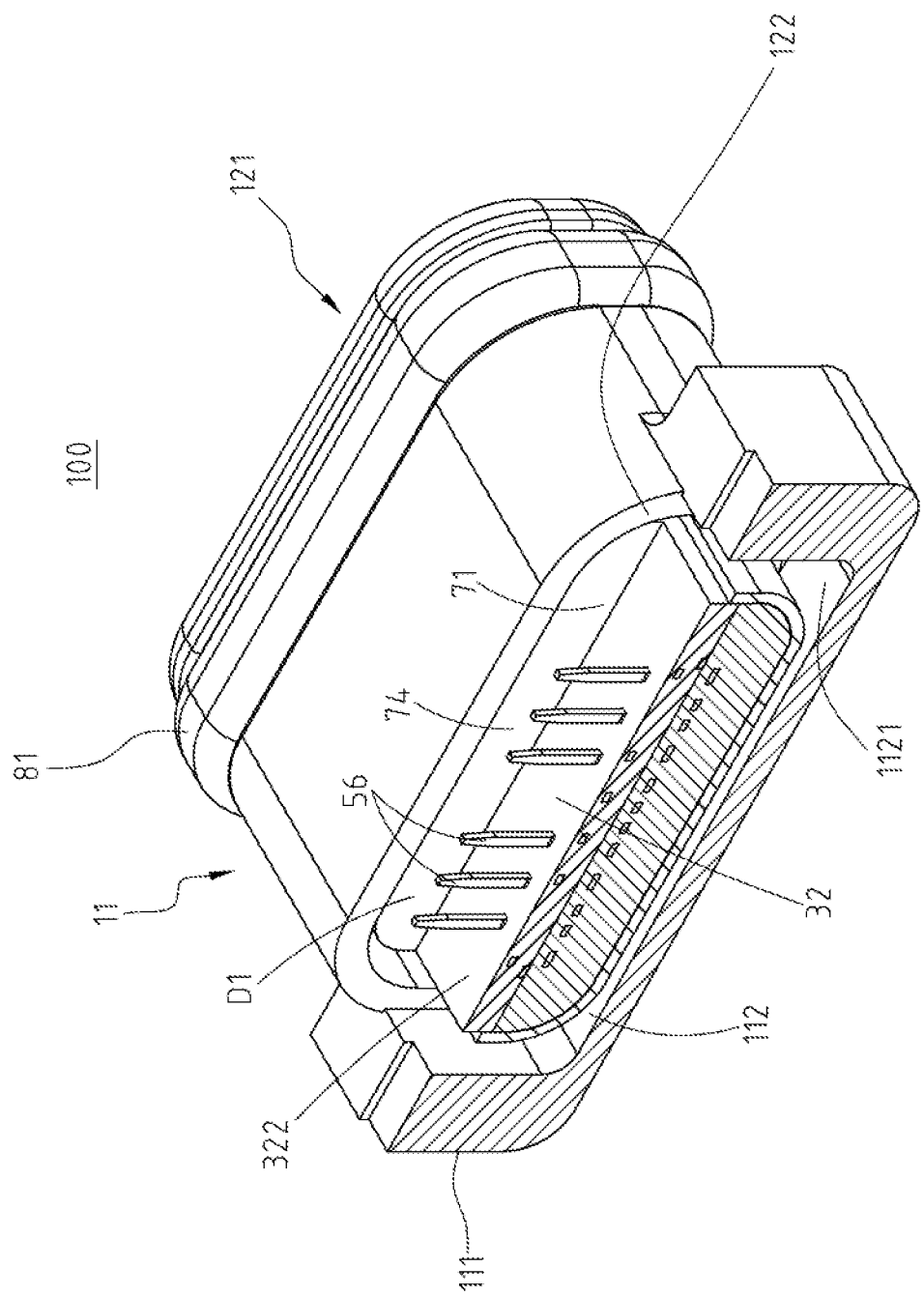
FIG. 8A illustrates a laid sectional view (1) of the waterproof electrical receptacle connector.

Please refer to FIGS. 7A and 7B. In this embodiment, a first glue dispensing procedure D1 is applied, as shown in FIG. 8A. In this embodiment, the sealing member 7 comprises a first sealing portion 71 formed at the bottom 322 of the base portion 32. Specifically, the first sealing portion 71 is formed at the area around the bottom 322 of the base portion 32 near the second gap C2. In this embodiment, to perform the first glue dispensing procedure D1, firstly the waterproof electrical receptacle connector 100 is stood, i.e., the inserting end 121 is at the bottom and the sealed end 122 is at the top. Then, the sealing member 7 in liquid state (i.e., uncured sealing member 7) is filled in the bottom 322 of the base portion 32, and the liquid sealing member 7 is further flowed into the second gap C2, so that the bottom 322 of the base portion 32 and the second gap C2 are filled by the liquid sealing member 7. After the liquid sealing member 7 is flowed into the second gap C2, a dry procedure can be applied to the connector, so that the liquid sealing member 7 becomes a solidified waterproof glue block 74 formed at the sealed end 122, and the bottom 322 of the base portion 32 and the second gap C2 are filled by the waterproof glue block 74. Therefore, a first level of waterproof function between the plastic shell 11 and the metallic shell 21 is provided. In addition, after solidification, the sealing member 7 becomes the solidified waterproof glue block 74, thus the first sealing portion 71 of the sealing member 7 would not be moved freely with respect to the sealed end 122 and prevents the gap being exposed.

Figure 8B:
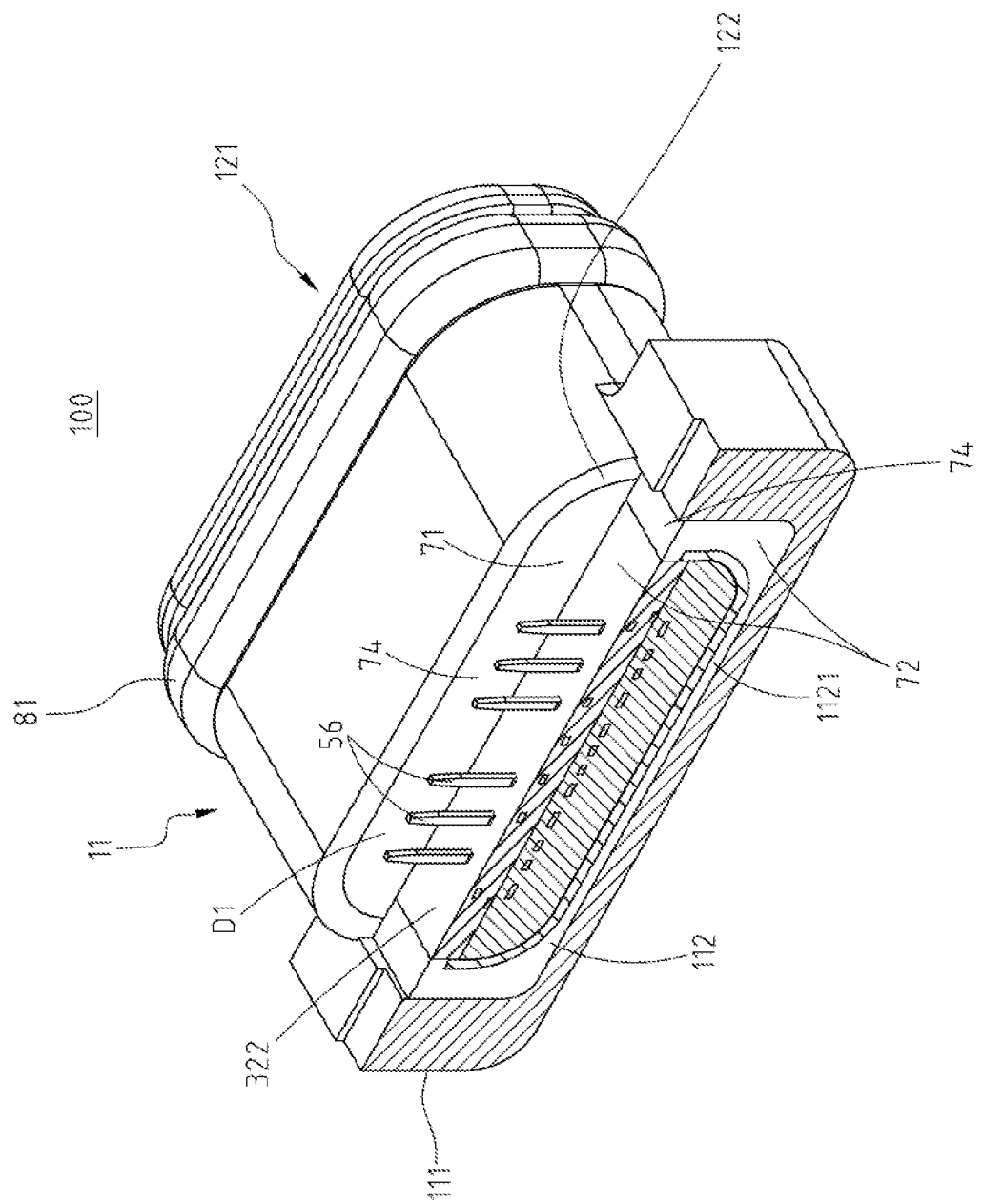
FIG. 8B illustrates a laid sectional view (2) of the waterproof electrical receptacle connector.
Figure 8C:
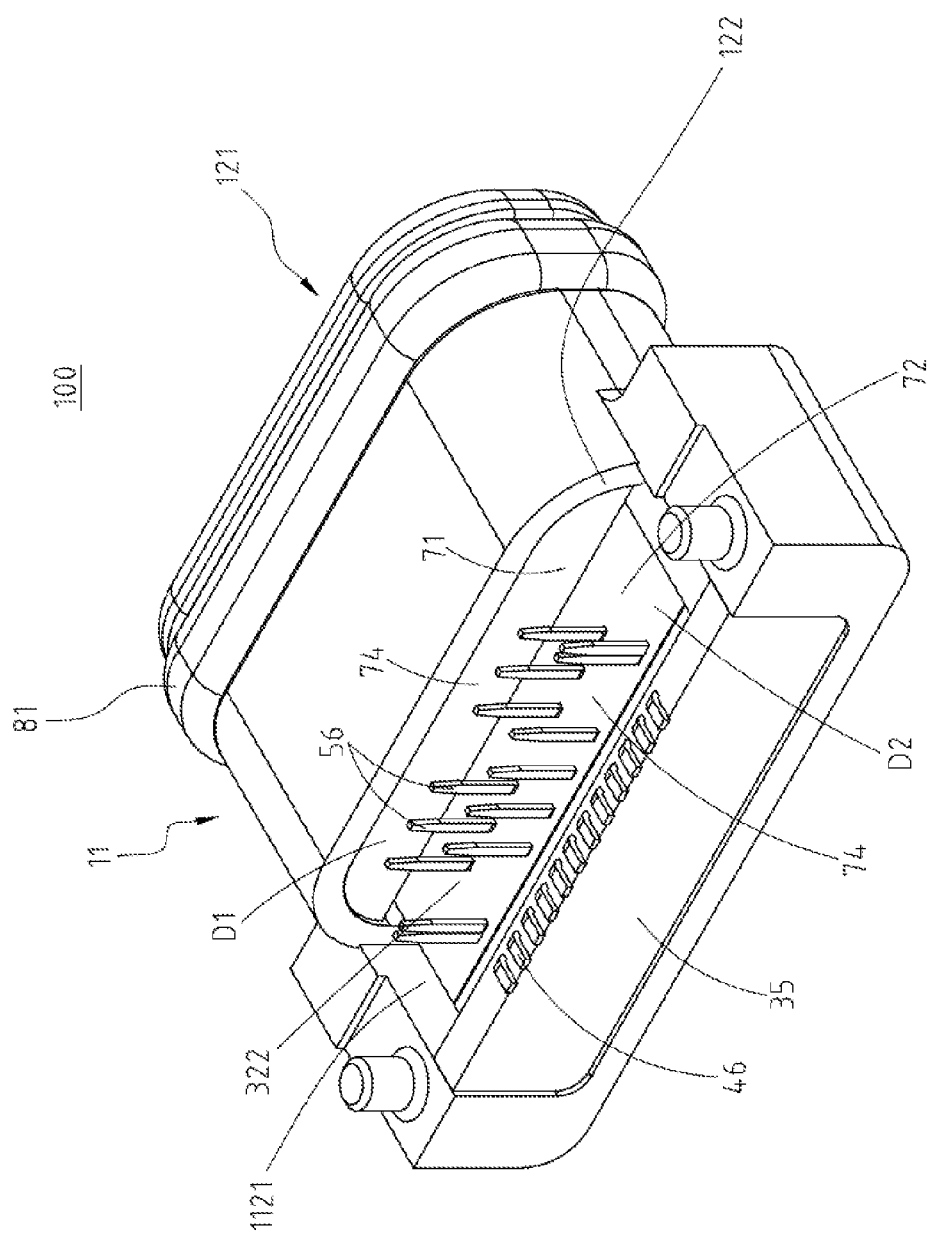
FIG. 8C illustrates a laid perspective view of the waterproof electrical receptacle connector.

After the first glue dispensing procedure D1 is completed, a second glue dispensing procedure D2 is applied. Please refer to FIGS. 8A to 8C, prior to the second glue dispensing procedure D2, the back of the waterproof electrical receptacle connector 100 is flipped to the front. In other words, the first tail portions 46 and the second tail portions 56 are upward standing, and the connector is in a laid configuration. And then, the sealing member 7 in liquid state (i.e., uncured sealing member 7) is filled in the bottom 322 of the base portion 32 and the filling section 112. In this embodiment, the sealing member 7 comprises a second sealing portion 72 (as shown in FIG. 7B). The second sealing portion 72 is formed at the bottom 322 of the base portion 32 from which the second receptacle terminals 5 are exposed and formed at the filling section 112. Specifically, the second sealing portion 72 is formed at the bottom 322 of the base portion 32 from which the second tail portions 56 are exposed. Then, the liquid sealing member 7 is flowed to the filling passage 1121 defined by the filling section 112 along the bottom 322 of the base portion 32, so that the sealing member 7 fills in the space between the second tail portions 56 and the base portion 32 and fills in the filling passage 1121. Therefore, a second level of waterproof function is provided between the second tail portions 56 and the base portion 32 and in the filling passage 1121. In this embodiment, two times of glue dispensing procedures are applied to the connector to achieve the waterproof function, but embodiments are not limited thereto. In some embodiments, three or more times of glue dispensing procedures may be applied to the connector for achieving better waterproof function.

In this embodiment, when the second tail portions 56 are combined with the base portion 32 by means of assembling, the glue dispensing procedures can provide the waterproof function. In other words, the base portion 32 defines a plurality of terminal grooves for assembling the second tail portions 56 respectively. After the second tail portions 56 are assembled to terminal grooves of the base portion 32, a gap may be defined between each of the second tail portions 56 and the corresponding terminal groove. Therefore, the sealing member 7 can be filled into the gaps and prevents water moist at the inserting end 121 from penetrating into the sealed end 122 through the gap between each of the second tail portions 56 and the corresponding terminal groove.

In the foregoing embodiment, the base portion 32 has the terminal grooves for passing through the second receptacle terminals 5, but embodiments are not limited thereto. Alternatively, according to some embodiments of the waterproof electrical receptacle connector 100, the insulated housing 31 may be integrally formed with the first receptacle terminals 4 and the second receptacle terminals 5. The insulated housing 31, the first receptacle terminals 4, and the second receptacle terminals 5 may be formed integrally by means of insert-molding, over-molding, a combination thereof, or the like. In the embodiment, the insulated housing 31 does not have the terminal grooves, and the first receptacle terminals 4 and the second receptacle terminals 5 are directly passing through the base portion 32. During a thermal procedure of the manufacturing of the waterproof electrical receptacle connector 100, e.g., heating in the flow convection oven, gaps may be formed among the metallic receptacle terminals 4, 5 and the plastic insulated housing 31 because of their different thermal expansion coefficients. Therefore, the waterproof function of the connector is not sufficient then. Thus, the sealing member 7 (e.g. the waterproof glue block 74) may be applied to the waterproof electrical receptacle connector 100, formed at the sealed end 122, and filled in the gaps inside the connector to improve the waterproof function of the connector.

In this embodiment, the waterproof electrical receptacle connector 100 further comprises a first waterproof gasket 81. The first waterproof gasket 81 is an O-shaped plastic gasket, and the plastic shell 11 further comprises an outer recessed portion 114 at the inserting end 121. The first waterproof gasket 81 is fitted over the outer recessed portion 114. Accordingly, when the waterproof electrical receptacle connector 100 is assembled to a casing of an electronic device, the first waterproof gasket 81 is abutted against the inner wall of the casing, so that water moist can be prevented from entering into the casing through the gap between the plastic shell 11 and the casing.

In this embodiment, the waterproof electrical receptacle connector 100 further comprises a second waterproof gasket 82. The second waterproof gasket 82 is an O-shaped plastic gasket. The second waterproof gasket 82 is disposed at the sealed end 122 and located in the through hole 12. The second waterproof gasket 82 is abutted against the inner wall of the plastic shell 11 and the outer wall of the metallic shell 21, so that the second waterproof gasket 82 can prevent water moist from entering into the connector from the gap between the plastic shell 11 and the metallic shell 21. In this embodiment, the plastic shell 11 comprises an inward recessed portion 115 formed at the inner wall of the plastic shell 11 and located at the sealed end 122. The second waterproof gasket 82 is disposed in the inward recessed portion 115 and positioned by the inward recessed portion 115.

Based on the above, the sealing member (e.g., the waterproof glue block) is formed at the sealed end of the plastic shell, and the sealing member fills the gaps between the plastic shell and the metallic shell and fills the bottom of the base portion where the second receptacle terminals are exposed out of. Accordingly, water moist cannot enter into the connector through the through hole. In addition, waterproof gaskets are fitted over the plastic shell and abutted against the inner wall of an electronic device assembled with the connector, so that water moist cannot enter into the electronic device through the gaps between the plastic shell and the metallic shell. Moreover, the waterproof gasket is abutted between the inner wall of the plastic shell and the outer wall of the metallic shell to prevent water moist from entering into the connector through the gap between the plastic shell and the metallic shell. Consequently, water moist can be efficiently prevented from entering into the electronic device assembled with the connector.

Furthermore, the first receptacle terminals and the second receptacle terminals are arranged upside down, and the pin-assignment of the first flat contact portions of the first receptacle terminals is left-right reversal with respect to that of the second flat contact portions of the second receptacle terminals. Accordingly, the waterproof electrical receptacle connector can have a 180 degree symmetrical, dual or double orientation design and pin assignments which enables the waterproof electrical receptacle connector to be mated with a corresponding plug connector in either of two intuitive orientations, i.e. in either upside-up or upside-down directions. Therefore, when an electrical plug connector is inserted into the waterproof electrical receptacle connector with a first orientation, the first flat contact portions of the first receptacle terminals are in contact with upper-row plug terminals of the electrical plug connector. Conversely, when the electrical plug connector is inserted into the waterproof electrical receptacle connector with a second orientation, the second flat contact portions of the second receptacle terminals are in contact with the upper-row plug terminals of the electrical plug connector. Note that, the inserting orientation of the electrical plug connector is not limited by the instant disclosure.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A waterproof electrical receptacle connector, comprising:
   a plastic shell defining a through hole and comprising an inserting end and a sealed end respectively at two sides of the through hole, wherein the plastic shell comprises an outer recessed portion;
   a metallic shell disposed in the through hole, wherein the metallic shell defines a receiving cavity;
   an insulated housing disposed in the receiving cavity, wherein the insulated housing comprises a base portion and a tongue portion, the tongue portion is extended from one side of the base portion, the tongue portion has an upper surface and a lower surface opposite to the upper surface, and wherein the base portion is located at the sealed end;
   a plurality of first receptacle terminals comprising a plurality of first signal terminals, at least one first power terminal, and at least one first ground terminal, wherein each of the first receptacle terminals is held in the insulated housing and disposed at the upper surface;
   a first waterproof gasket fitted over the outer recessed portion and located at the inserting end;
   a second waterproof gasket disposed at the sealed end and located in the through hole, wherein the second waterproof gasket is abutted against the inner wall of the plastic shell and the outer wall of the metallic shell; and
   a sealing member formed at the sealed end to fill a gap between the metallic shell and the plastic shell and to fill the bottom of the base portion.

2. The waterproof electrical receptacle connector according to claim 1, wherein the plastic shell comprises an inward recessed portion formed at the inner wall of the plastic shell and located at the sealed end, the second waterproof gasket is disposed in the inward recessed portion.

3. The waterproof electrical receptacle connector according to claim 1, further comprising a plurality of second receptacle terminals, wherein the second receptacle terminals comprise a plurality of second signal terminals, at least one second power terminal, and at least one second ground terminal, wherein each of the second receptacle terminals is held in the insulated housing and disposed at the lower surface.

4. The waterproof electrical receptacle connector according to claim 3, wherein the first receptacle terminals and the second receptacle terminals have 180 degree symmetrical design with respect to a central point of the receiving cavity as the symmetrical center.

5. The waterproof electrical receptacle connector according to claim 4, wherein the position of the first receptacle terminals corresponds to the position of the second receptacle terminals.

6. The waterproof electrical receptacle connector according to claim 1, wherein the plastic shell comprises a rear lid and a filling section, wherein the rear lid is extended from the rear of the plastic shell and located at the sealed end, the filling section is formed between the rear lid and the base portion.

7. The waterproof electrical receptacle connector according to claim 6, wherein the insulated housing comprises a plastic block extended from the rear of the base portion to abut against the inner wall of the rear lid, and the plastic block, the rear lid, and the base portion define the filling section as a filling passage.

8. The waterproof electrical receptacle connector according to claim 6, wherein the sealing member comprises a first sealing portion filled in the bottom of the base portion near the gap.

9. The waterproof electrical receptacle connector according to claim 8, wherein the sealing member comprises a second sealing portion filled in the bottom of the base portion and the filling section.

10. The waterproof electrical receptacle connector according to claim 1, further comprising a grounding plate disposed at the insulated housing.

\* \* \* \* \*